June 19, 1962     F. R. KARR     3,040,199
DYNAMOELECTRIC MACHINE
Filed June 30, 1958
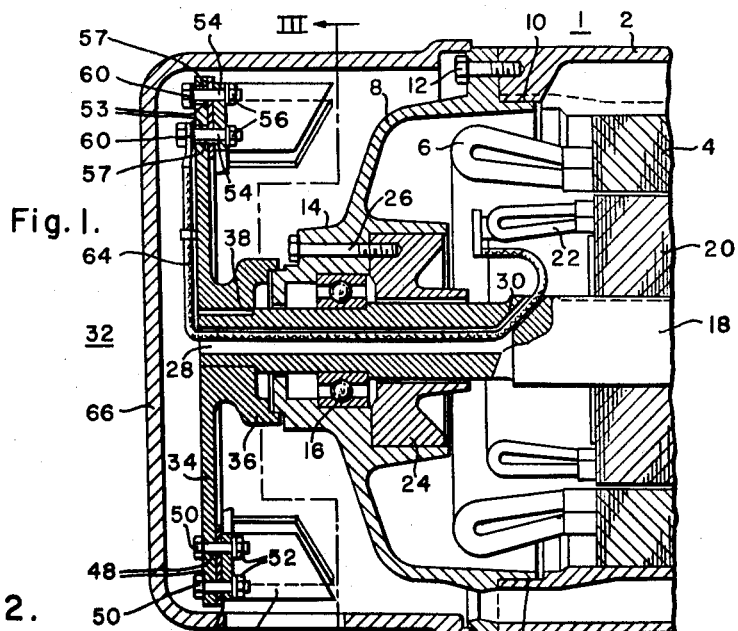
WITNESSES:
INVENTOR
Francis R. Karr,
BY
ATTORNEY

3,040,199
DYNAMOELECTRIC MACHINE

Francis R. Karr, Lancaster, N.Y., assignor to Westinghouse Electric Corporation, East Pittsburgh, Pa., a corporation of Pennsylvania
Filed June 30, 1958, Ser. No. 745,556
2 Claims. (Cl. 310—159)

The present invention relates to dynamoelectric machines, and more particularly to an improved heat dissipation system for high starting torque induction type motors.

In certain applications, high starting torque, together with frequent stopping and starting under load or rapid reversing is required. It is necessary in these uses that the rotor windings of an induction motor present a high electric resistance in order to develop the high starting torque required. Such a high resistance rotor permits starting the motor under load when the voltage at the source is reduced due to high voltage regulation resulting from the high currents being taken by the motor at that time. The increased resistance causes relatively high running losses, and, consequently, an increase in the heat developed. This results in serious heat dissipation problems. A conventional wound rotor motor is ordinarily used where high starting torque is required with moderate starting current. However, the initial costs and maintenance are too great in such motors for many applications. It also has been the practice in the past to use squirrel cage induction motors with end rings and rotor bars having higher than normal resistance in order to obtain high starting torque, rapid reversing and frequent starts and stops in applications such as punch-press motors. The additional heat generated in this type of motor must be dissipated through the frame in a totally enclosed squirrel cage motor. Slow heat transfer results in larger than normal frame sizes. This is less desirable than the wound rotor motor which permits the use of external resistance whereby the heat loss occurs outside the motor. However, the initial cost and maintenance required in providing slip rings, brushes and a control system render a conventional wound rotor motor impractical for many purposes.

A totally enclosed motor having external rotor resistance and a fan or other means to dissipate the heat generated in the resistance would be desirable for high starting torque, rapid reversing or rapid starting and stopping applications.

It is, therefore, an object of this invention to provide an induction motor utilizing an external rotor resistance which is rotatable with the shaft and requires no slip rings.

Another object of this invention is to provide an improved totally enclosed wound rotor induction motor having high starting torque with moderate starting currents and which utilizes external rotor resistance rotatable with the shaft and fan cooling means for dissipating the heat generated in the resistance.

A further object of this invention is to provide an improved totally enclosed fan cooled wound rotor induction motor having high starting torque with moderate starting current which utilizes blower vanes of high resistance material for providing rotor resistance.

Other objects and advantages of the invention will be apparent from the following detailed description, taken in connection with the accompanying drawings, in which:

FIGURE 1 is a longitudinal view of a portion of a motor embodying the invention partially in section;

FIG. 2 is an electric diagram showing the circuitry of the motor of this invention; and FIG. 3 is a transverse sectional view of the motor of this invention taken on line III—III of FIG. 1.

Referring now to the drawings, there is shown a wound rotor induction motor generally indicated at 1. The motor 1 has a frame 2 in which is supported the usual stator core 4 having stator windings 6 supported in slots therein. The frame 2 is closed at its ends by a pair of end brackets of which only one end bracket 8 is shown. The end bracket 8 engages the frame 2 by a rabbet fit as at 10 and is secured to the frame in any suitable manner as, for example, by bolts 12. End bracket 8 has formed centrally thereof a bearing housing 14 in which is mounted an anti-friction bearing 16. A rotatable shaft 18 is received at one end in the bearing 16. The shaft 18 is supported similarly in a bearing at the other end (not shown) of the motor.

A rotor 20 having a three-phase rotor winding 22 is mounted on shaft 18 within stator 4 for rotation with the shaft. A bearing cap 24 is received in a recess in an end bracket 8 adjacent the bearing housing 14 and toward the interior of the motor. The bearing cap 24 is held in position by bolts 26 extending axially through the bearing housing. The shaft 18 extends outwardly through the end bracket 8 and bearing housing 14. It has a central bore 28 which extends from the end of the shaft inwardly to a plane adjacent the end of the rotor and a plurality of radial openings 30 extending radially from the outer periphery of the shaft 18 to the central bore 28.

A blower assembly 32 is mounted on the end of the shaft 18 exteriorly of the end bracket 8. The blower assembly 32 comprises a disc 34 having an inwardly extending hub portion 36 which engages the shaft 18.

The end of the shaft 18 which is received in the hub portion 36 is of reduced diameter forming a shoulder 38 which engages the inner diameter of the hub 36 to position it longitudinally. The hub 36 may be rigidly secured to the shaft for rotation therewith in any suitable manner as for example by a pressed fit. The disc 34 is preferably of electrically conducting material. An annular ring 40 of insulating material is positioned on the side of the disc adjacent the end bracket 8. As can best be seen in FIG. 3, a plurality of arcuate blower vane assemblies 42 are positioned on the annular insulating ring 40 and spaced circumferentially therearound. There are at least one of these blower vane assemblies 42 for each phase of the rotor winding 22. There may be additional vane assemblies 42 if desired. Three of these assemblies 42 are illustrated by way of example, since a three-phase rotor winding is shown, but it will, of course, be understood that any number of phase windings may be used as well as any number of blower vane assemblies.

The blower vane assemblies comprise a flat arcuate portion 44 which lies upon the face of the annular insulating member 40 and inwardly extending blower vanes 46 integral with the flat portion 44. Each of the blower vane assemblies are of equal length. They are of high resistance conducting material. A plurality of bolt receiving openings 48 are bored through the vane assemblies 42, the annular ring 40 and the disc 34. The bolts 50 pass through the bolt receiving openings 48 in order to secure the blower vane assemblies and the annular rings 40 to the disc 34. Nuts 52 are threaded on the ends of the bolts to rigidly secure the parts together. The bolts 50, in addition to aiding in securing the parts together, electrically connect the blower vane assemblies 42 to the conducting disc 34. The opening 48 and its associated bolts 50 and nuts 52 are positioned adjacent one end of each blower vane assembly 42. Other openings 53 pass through the blower vane assemblies, the insulating ring 40 and the disc 34 and are positioned adjacent the other end of each blower vane assembly. These openings have associated therewith bolts 54 which pass through the openings and receive nuts 56 which engage the blower vanes and secure the blower assemblies together. The portion of the openings 52 which pass through the conducting disc 34 have insulating grommets 57 therein to insulate the bolts 54 from the disc 34. There is also an insulating washer 60 between the head of the bolts 54 and the face of the disc 34. For additional rigidity and better securement other bolts such as 62 may pass through the parts of the blower assembly. The arrangement of these bolts 62 is similar to bolts 54 in that they are insulated from the disc 34. A lead 64 extends from each phase of the rotor windings 22 through radial bore 30 and central bore 28 in the shaft 18 to the outside of the disc 34, and is connected to one of the bolts 54.

Thus, it can be seen that a star-connected external rotor resistance is provided by the blower assemblies 32. The disc 34 serves as the neutral point. This will be better understood by reference to FIG. 2. One end of each of the blower vane assemblies is connected to one phase of the rotor winding 22 by bolt 54 and insulated from the neutral point or disc 34 by grommet 57 and washers. The blower vane assemblies 42 serve the dual purpose of a ventilating fan and resistance elements. They are rotatable with the shaft so as to eliminate the need for slip rings. Since the blower vane assemblies 42 are of equal length and each of the same material, and since the distance between the bolts 54 and 50 of each blower vane assembly 42 are equally spaced a balanced, three-phase, start-connected resistance is provided. FIG. 2 shows the electrical relationship of these elements. Point A corresponds to the disc 34, the resistance B corresponds to the portion of the blower vane between bolts 50 and 54. C represents the rotor winding, D represents the stator windings, and E represents the alternating current line which supplies the stator. The blower assembly is enclosed by a cap 66 having openings 68 for entrance and exhaust of cooling air. The cap is secured to the end bracket 8 in any suitable manner as by a rabbet fit.

The operation of the motor should be clear from the above detailed description. The motor operates like the conventional wound rotor motor with a fixed resistance. The vane assembly 42 or resistance rotates with the rotor, and the fan blades extending therefrom drive the hot air out through the openings in the cap 66. The design of the blower provides a means to draw cool air in over the frame and to discharge the heat created in the blower vane. It is possible to change the slip range from 5–8% to a range of 18–13% on the same frame size by merely changing the blower vane assembly material. The losses in the external blower can heat exchange with external cooling air and will allow the same ratings to be built on smaller frame sizes and permit the raising of the horsepower ratings.

It will, of course, be understood that the invention is capable of various modifications and embodiments. Thus, in some cases, it may be desirable to provide a delta-connected external resistance, and this may be done by connecting the blower vane assemblies 42 together or by using a single annular blower vane assembly and insulating all of the bolts 50, 54 and 62. Alternatively, an integral blower assembly may be provided with connections from each phase of the secondary windings at equally spaced points on the blower assembly.

It will now be apparent that a wound rotor induction motor has been provided which is capable of rapid reversing, frequent starts and stops and high starting torque with moderate current due to the utilization of an external fixed resistance which is rotatable with the shaft and which is capable of rapid dissipation of the heat generated under these conditions. This device makes it possible to increase the slip and to use higher horsepower rating on smaller frames; it is less expensive than conventional wound rotor motors and eliminates slip rings and associated controls.

A specific embodiment of the invention has been shown and described for the purpose of illustration but it will be apparent that various other modifications and embodiments are possible within the scope of the invention.

I claim as my invention:

1. In a totally enclosed dynamoelectric machine having a polyphase wound rotor secured to a hollow rotatable shaft extending exteriorly of said enclosed machine, a blower secured to said shaft exteriorly of said enclosed machine, said blower comprising a hub portion having open ends secured to said shaft, a disc portion of conducting material integral with said hub, a plurality of arcuate plates of high resistance conducting material having blower vanes protruding therefrom secured to a side of said disc and disposed circumferentially, a ring of insulating material intermediate said disc and said plates, a plurality of radial passages in said hollow shaft in communication with the hollow portion of said shaft, a plurality of conductors including one for each phase winding of said rotor, each conductor extending from one phase winding through one of said radial passages and the hollow portion of said shaft, means for electrically connecting each of said conductors adjacent one end of one of said arcuate plates, and means for electrically connecting said disc adjacent the other end of each of said plates.

2. In a totally enclosed dynamoelectric machine having a polyphase wound rotor secured to a hollow rotatable shaft extending exteriorly of said enclosed machine, a blower secured to said shaft exteriorly of said enclosed machine, said blower comprising a hub portion having open ends secured to said shaft, a disc portion of conducting material integral with said hub, a plurality of arcuate plates of high resistance conducting material having blower vanes protruding therefrom secured to a side of said disc and disposed circumferentially, a ring of insulating material intermediate said disc and said plates, a plurality of radial passages in said hollow shaft communicating with the hollow portion of said shaft, a plurality of conductors including one for each phase winding of said rotor, each conductor extending from one phase winding through one of said radial passages and the hollow portion of said shaft, means for electrically connecting each of said conductors adjacent one end of one of said arcuate plates, means for electrically connecting said disc adjacent the other end of each of said plates, the resistance of said plates being equal between their respective points of connection to said conductor and said disc.

References Cited in the file of this patent

UNITED STATES PATENTS

| | | |
|---|---|---|
| 1,587,760 | Connell | June 8, 1926 |
| 1,685,677 | Maxwell | Sept. 25, 1928 |
| 1,851,155 | Schmidt-Burgk et al. | Mar. 29, 1932 |
| 2,634,379 | Brainard | Apr. 7, 1953 |
| 2,742,223 | Fout | Apr. 17, 1956 |
| 2,910,600 | Young | Oct. 27, 1959 |